UNITED STATES PATENT OFFICE.

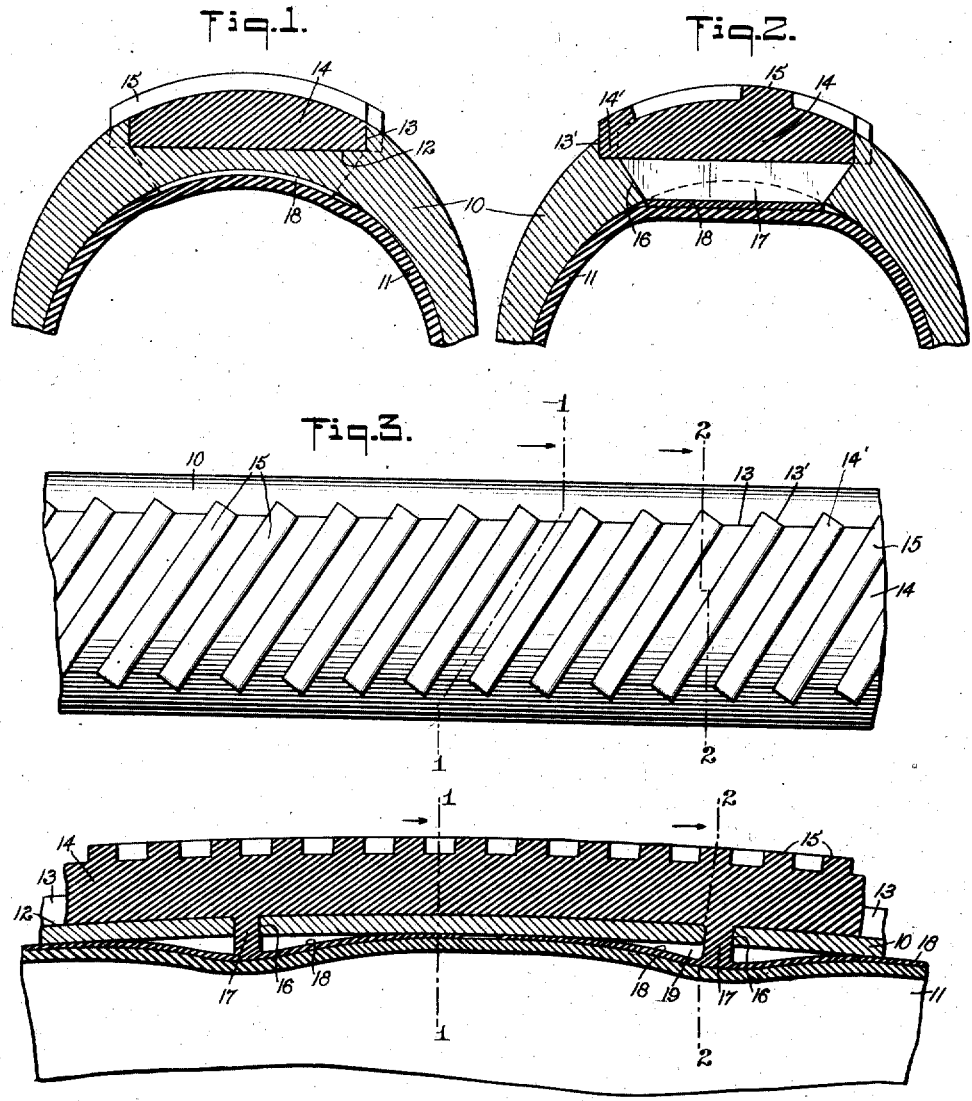

EMILE BARDELLE, OF NEW YORK, N. Y.

AUXILIARY TREAD FOR TIRES.

1,243,578.    Specification of Letters Patent.    Patented Oct. 16, 1917.

Application filed March 2, 1917. Serial No. 151,988.

*To all whom it may concern:*

Be it known that I, EMILE BARDELLE, a citizen of the United States, and resident of the city of New York, Stapleton, borough of Richmond, in the county of Richmond and State of New York, have invented a new and Improved Auxiliary Tread for Tires, of which the following is a full, clear, and exact description.

This invention relates to resilient tires and has particular reference to an improved construction of tread members for such tires.

Among the objects of the invention is to provide a special form of tire or shoe adapted to have removably secured thereto an auxiliary annular member or wearing portion.

Another object of the invention is to provide an improved means for applying a new or fresh tread member to the same shoe after the previous tread member has become worn out or disabled.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a vertical transverse section on a diagonal plane corresponding to the lines 1—1 of Figs. 3 and 4.

Fig. 2 is a vertical transverse section on the lines 2—2 of Figs. 3 and 4.

Fig. 3 is a plan view of a portion of a shoe having my improved tread secured thereto; and Fig. 4 is a vertical longitudinal section of the same.

Referring now more particularly to the drawings I show a pneumatic tire comprising a shoe 10 of any suitable or conventional design of construction and adapted to house and protect any standard inner tube 11. My invention has nothing to do with the means for securing the shoe to the wheel rim and hence these features are not shown.

The outer or tread portion of the shoe is so constructed as to provide a circumferential channel 12 extending entirely around the shoe and approximately fully across the tread portion thereof but bounded by parallel vertical walls 13, said walls, however, being provided with lateral V-shaped indentations or notches 13' systematically arranged and equally spaced all around the shoe. I do not wish to be unnecessarily limited, however, to the form or disposition of the walls 13 inasmuch as the precise construction or arrangement thereof is subject to more or less variation in practice. The bottom of the channel 12 may be of any suitable form but shown herein as substantially flat in cross section or cylindrical with respect to the tire as a whole.

The auxiliary tread consists of a continuous annular member, the main portion 14 of which lies in and fills the channel 12. The outer surface of the body 14 is provided with any suitable character or design of projections 15 for anti-skid purposes. These projections are shown in the nature of ribs, the V-shaped ends of which extend laterally beyond the main planes of the walls 13, said ends and the portions 14' of the body directly within or beneath the same extending into the notches 13' filling the same. These portions 14' interlocking in or with the notches 13' serve as keys preventing any possibility of creeping or circumferential movement of the auxiliary tread around the shoe.

The shoe is provided with any suitable number of preferably equally spaced transverse slots 16. The length of each slot in the direction transverse of the wheel may be equal to or greater or less than the width of the auxiliary tread, but each slot is shown herein as being tapered somewhat inwardly. The width of the slot in a direction circumferential of the wheel is considerably less than the length of the slot, say, for example, from one quarter to one half of an inch in such width.

For each slot 16 formed in the shoe there is provided for the auxiliary tread 14 a tongue 17 projecting radially inwardly through such slot. The ends of the tongue are preferably beveled to correspond to the shape of the ends of the slot into which they are snugly fitted and the inner end of the tongue may be substantially parallel with the bottom or inner wall of the auxiliary tread body 14, (see Fig. 2.) Formed on or otherwise permanently and strongly secured to said inner end or edge of the tongue are a pair of flaps 18 extending in opposite directions from each other circumferentially of the shoe and lying between the inner wall of the shoe and the outer wall of the inner tube 11. These flaps may be of any suitable length, but I indicate such length as providing for the flap from one tongue to reach approximately to the adjacent flap of the next adjacent tongue. (See Fig. 4.) By providing ample length for the tongues the application of the auxiliary tread to the shoe is facilitated and no objection obtains in having a slight space as indicated at 19 between the flaps and the slotted portion of the shoe. These tongues and flaps serve as anchoring means preventing any possibility of outward radial movement of the auxiliary tread in practice. When the shoe, however, is removed from the wheel and the inner tube is deflated the auxiliary tread may be removed and another put in its place when necessary. The free ends of each pair of flaps may pass radially through the slot 16 and thereby the attached tongue will be drawn into its place. Thereafter the flaps are separated and laid out substantially flatly upon the inner wall of the shoe where the inner tube will come against them to hold them in place. Obviously the auxiliary tread and its anchoring means may be formed of any suitable tough, strong, flexible or even resilient material, and hence I make no attempt in this disclosure to enumerate any of the many possible compositions that may be used for this purpose.

I claim:

1. The combination with a pneumatic tire shoe having a circumferential channel extending along its tread portion and the shoe within said tread portion being provided with a series of openings, of an auxiliary tread fitted in said channel, and flexible tongue means carried by said auxiliary tread as integral parts thereof and extending thence radially inwardly through said openings to anchor the auxiliary tread detachably in place in connection with the shoe.

2. The combination with a pneumatic tire shoe having a series of transversely extending slots formed along its tread portion, of an auxiliary tread for said shoe having a series of tongues extending inwardly from its inner surface through said slots, and means to anchor said tongues and tread from outward movement.

3. The combination with a pneumatic tire shoe having a circumferential series of openings through its tread portion and an inner tube, of an auxiliary tread having attached anchor members extending inwardly through said openings, and flexible members secured to the inner ends of said anchor members and adapted to lie between the inner tube and the inner wall of the shoe to prevent outward movement of the auxiliary tread.

4. The combination, with a pneumatic tire shoe having a circumferential series of transversely arranged slots formed through its tread portion, an inner tube, an auxiliary tread surrounding the shoe, a series of tongues projecting inwardly from the auxiliary tread through said slots, and flexible flaps carried by the inner ends of the tongues and adapted to lie substantially flatly between the inner tube and the inner surface of the shoe, whereby the auxiliary tread is prevented from outward movement.

5. The combination with a pneumatic tire shoe having a circumferential channel formed in its tread portion, said channel having laterally projecting V-shaped notches formed in its side walls, of an auxiliary tread, the body of which is fitted wholly within said channel and provided with V-shaped projections fitted into said notches, whereby creeping movement of the auxiliary tread is prevented, and means extending through the tread portion of the shoe to detachably hold the auxiliary tread from outward movement.

EMILE BARDELLE